US008844860B2

(12) United States Patent
Lundgren

(10) Patent No.: US 8,844,860 B2
(45) Date of Patent: Sep. 30, 2014

(54) FOLDABLE RISE AND STARE VEHICLE

(75) Inventor: Gert Magnus Lundgren, Chula Vista, CA (US)

(73) Assignee: LAPCAD Engineering, Inc., San Diego, CA (US)

( * ) Notice: Subject to any disclaimer, the term of this patent is extended or adjusted under 35 U.S.C. 154(b) by 255 days.

(21) Appl. No.: 13/543,722

(22) Filed: Jul. 6, 2012

(65) Prior Publication Data
US 2014/0008485 A1    Jan. 9, 2014

(51) Int. Cl.
*B64C 11/00*    (2006.01)

(52) U.S. Cl.
USPC ............... 244/17.13; 244/23 A; 244/17.23; 244/17.17

(58) Field of Classification Search
USPC ...... 244/17.13, 17.11, 17.19, 17.23, 54, 53 R
See application file for complete search history.

(56) References Cited

U.S. PATENT DOCUMENTS

| | | | | |
|---|---|---|---|---|
| 2,378,617 A | * | 6/1945 | Burke | 416/121 |
| 3,332,643 A | * | 7/1967 | Toner | 244/7 R |
| 3,591,109 A | * | 7/1971 | McLarty | 244/17.23 |
| 6,719,244 B1 | * | 4/2004 | Gress | 244/7 R |
| 7,472,863 B2 | * | 1/2009 | Pak | 244/12.5 |
| 7,712,701 B1 | * | 5/2010 | Ehrmantraut et al. | 244/23 C |
| 7,857,254 B2 | * | 12/2010 | Parks | 244/12.4 |
| 8,152,096 B2 | * | 4/2012 | Smith | 244/60 |
| 2005/0045762 A1 | * | 3/2005 | Pham | 244/7 R |
| 2007/0105474 A1 | * | 5/2007 | Gotou et al. | 446/37 |
| 2009/0008499 A1 | * | 1/2009 | Shaw | 244/17.23 |
| 2010/0243794 A1 | * | 9/2010 | Jermyn | 244/17.23 |
| 2011/0001020 A1 | * | 1/2011 | Forgac | 244/7 A |
| 2011/0031355 A1 | * | 2/2011 | Alvarez | 244/7 R |
| 2011/0147511 A1 | * | 6/2011 | Poltorak | 244/17.19 |
| 2012/0056040 A1 | * | 3/2012 | Brotherton-Ratcliffe et al. | 244/23 A |
| 2012/0241553 A1 | * | 9/2012 | Wilke | 244/17.13 |
| 2013/0206919 A1 | * | 8/2013 | Shachor et al. | 244/23 A |
| 2014/0138477 A1 | * | 5/2014 | Keennon et al. | 244/17.23 |

* cited by examiner

*Primary Examiner* — Christopher P Ellis
*Assistant Examiner* — Medhat Badawi

(57) ABSTRACT

A Foldable Rise and Stare Vehicle with a single engine assembly that contains a pair of inline counter-rotating propellers.
Two inline counter-rotating engines are directly connected to the propellers.
Gimbal mounting the engine assembly permits thrust to be directed forward to back and left to right to control the vehicle position in the horizontal plane, when hovering.
Varying the relative engine speeds controls yaw.
The Foldable Rise and Stare Vehicle is adaptable as an unmanned vehicle.
The vehicle collapses into a flat assembly similar to a foldable beach chair, allowing for convenient transportation.

7 Claims, 7 Drawing Sheets

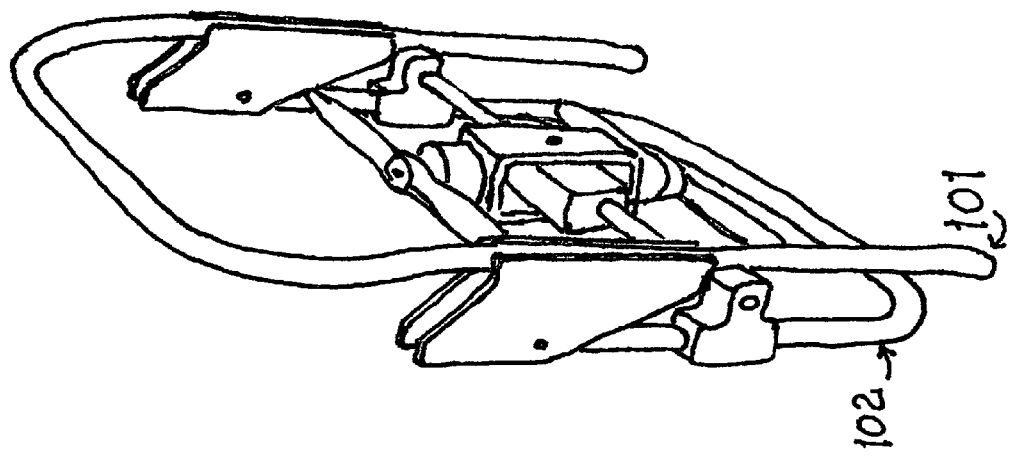

FOLDABLE RISE AND STARE VEHICLE

TECHNICAL FIELD

The present invention relates generally to Vertical Take-off and Landing Hover Vehicles, and more particularly to a Foldable Rise and Stare Vehicle, used as a camera platform.

BACKGROUND OF THE INVENTION

Rise and Stare Vehicles are flying machines intended for use in reconnaissance and aerial photography. These types of vehicles are characterized by their capability to quickly climb to a predetermined location, then stay at that position while performing its function. Configurations have included the quad rotor Shrike by AeroVironment, and the T-Hawk by Honeywell.

From the foregoing it will be apparent that by using only two electric or gas powered engines, cost and complexity can be minimized. Further, it will be apparent that by enclosing the vehicle with a simple frame, safety can be increased when operating near or inside buildings. It will also be apparent that by dividing the frame into two components, the vehicle can be folded to the size of a small beach chair, and carried on the back of a soldier.

The Foldable Rise and Stare Vehicle invention described in the following, has been reduced to practise, via a prototype that has performed repeatedly as predicted, both indoors and outdoors.

SUMMARY OF THE INVENTION

In a preferred embodiment, inline counter-rotating propellers are employed on a Foldable Rise and Stare Vehicle, that does not require a transmission to create the counter rotation of the individual propellers. In vertical hover mode, loss of one engine will still allow the remaining engine to provide a survivable rate of descent.

In one embodiment of the invention, a vehicle employs a single engine assembly (and thrust line) with a pair of inline counter-rotating propellers and a pair of inline counter-rotating engines, where each engine/propeller is individually controllable and physically independent thus no transmission connecting the two engines is involved.

In another embodiment, the engine engine assembly is mounted such that the engine engine assembly (and the thrust line) is rotatable about the longitudinal axis of the aircraft, providing the ability to direct thrust downward and to the right or downward and to the left. Rotating the engine engine assembly (and the thrust line) around the lateral axis thereby providing the ability to direct thrust downward and forward or downward and rearward, see FIG. 3. This arrangement eliminates the need for a complex collective and cyclic blade pitch assembly.

In another embodiment of the present invention, the relative speed of the inline counter-rotating engines is varied to control yaw in vertical hover mode. In this case, under normal operating conditions, both engines turn at the same speed and the torque produced by the first engine and propeller is equal to the torque produced by the second engine and propeller, but in the opposite direction, so the combined torque on the vehicle is zero. Also, each engine and propeller produces half of the total thrust. When the speed of one engine is increased and the speed of the other engine is decreased by the same amount, the resulting non-zero net torque results in yaw of the vehicle with no net change in the thrust produced by the pair of propellers. With this arrangement, there is no need for additional control surfaces situated in the downwash of the propellers to control yaw. A further embodiment includes electric motors as an alternative to internal combustion engines, to drive the propellers. This provides for easier control of relative motor speed and provides quicker yaw response.

In another embodiment of the present invention is an automatic feedback control mechanism for stabilizing hover characteristics of the vehicle.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIGS. 6 and 7 shows the vehicle in a folded transportable condition, standing on the edge.

DETAILED DESCRIPTION OF THE INVENTION

Figure 1:
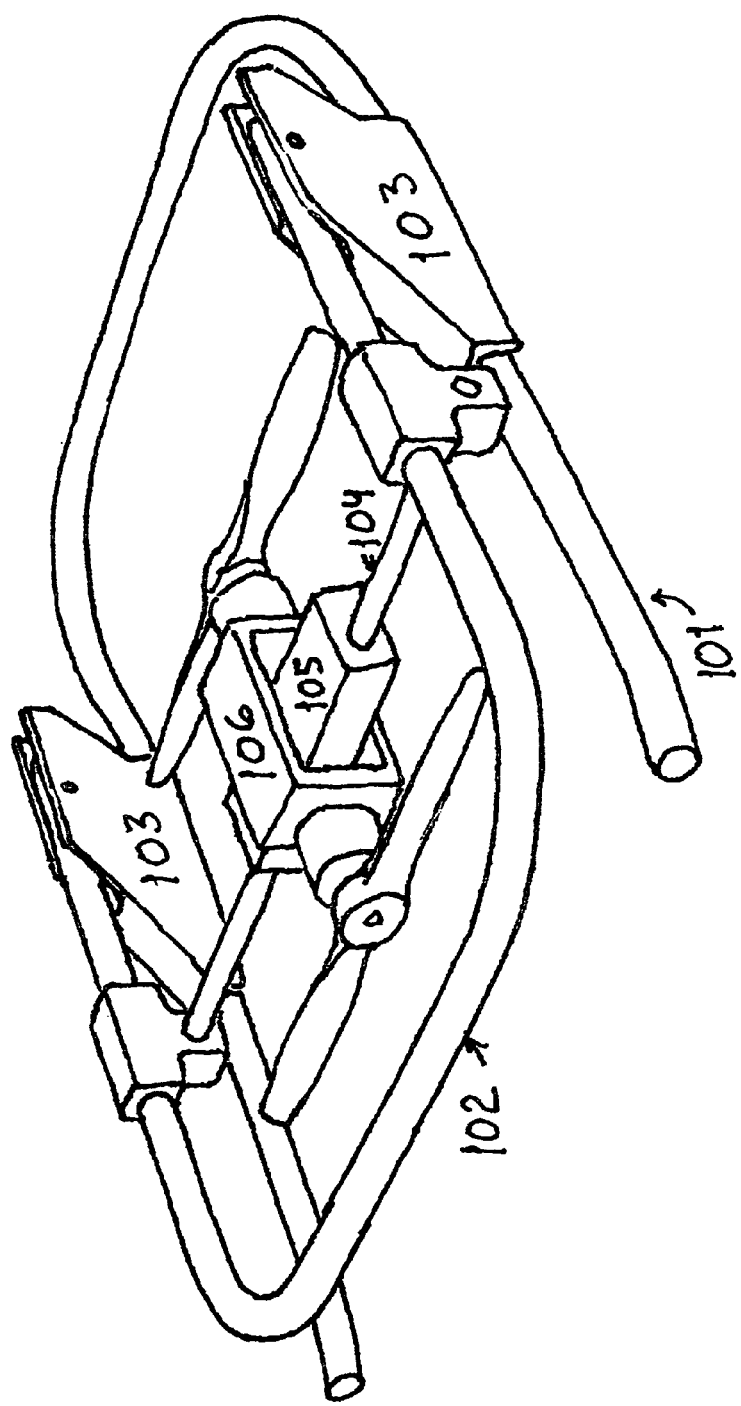
FIG. 1 shows the vehicle laying down in the folded transportable condition.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Introduction

The drawings show for purposes of illustration, a Foldable Rise and Stare Vehicle with VTOL capability. It utilizes a single centrally located tilt-able engine assembly containing a pair of inline counter-rotating propellers, driven by individual electric or piston engines. This provides for a simplified mechanism that does not require a transmission to create the counter-rotation of the propellers. By mounting the engine assembly in such a way that the engine assembly can be rotated about the longitudinal axis and by independent engine speed control, a simplified flight control system for vertical hover mode may be achieved. In an additional embodiment, a simplified flight stabilization system is applied to the flight control system. Also, in another embodiment, the flight control system is operated by remote control.

FIG. 1 shows a perspective view of a Foldable Rise and Stare Vehicle (referred to generally as 100) in a folded transportation mode according to one embodiment of the invention. The foldable frame 102 is connected to the base frame 101 via the joiners 103.

Figure 2:
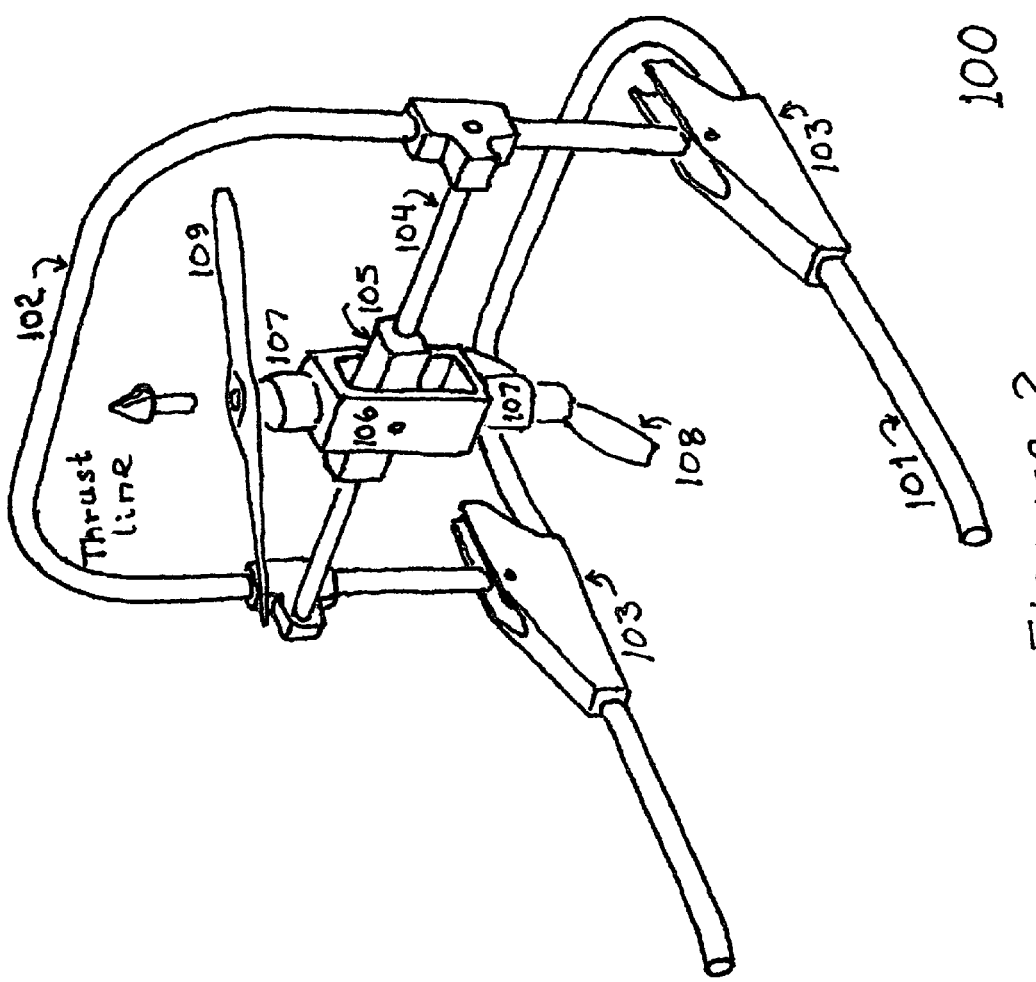
FIG. 2 shows the vehicle in an flight ready condition.

FIG. 2 shows the Foldable Rise and Stare Vehicle in a flight ready condition. The foldable frame 102 supports the engine beam 104 via two lugs with bearings, to which the hub 105 is attached. The engine frame 106 is attached to the hub 105, via bearings. The motors 107 are rigidly attached to the engine frame 106. The pusher propeller 108 and the tractor propeller 109 attach individually to each of the two engines 107. The thrust line indicates the direction of the thrust vector, which by means of the tilt-able engine assembly can be directed as needed to achieve the desired position of the Foldable Rise and Stare Vehicle.

Figure 3:
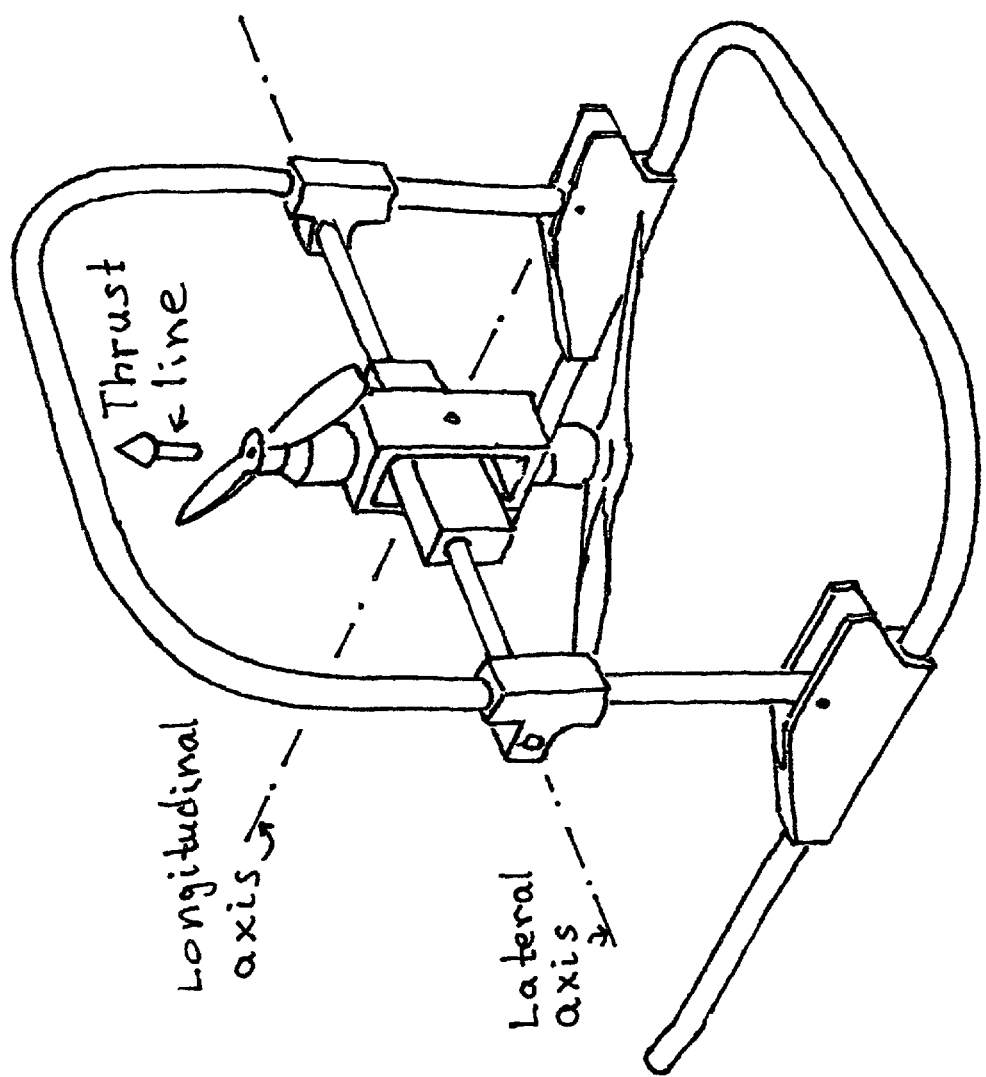
FIGS. 3 through 5 shows the vehicle described in FIG. 2, from different angles.
Figure 4:
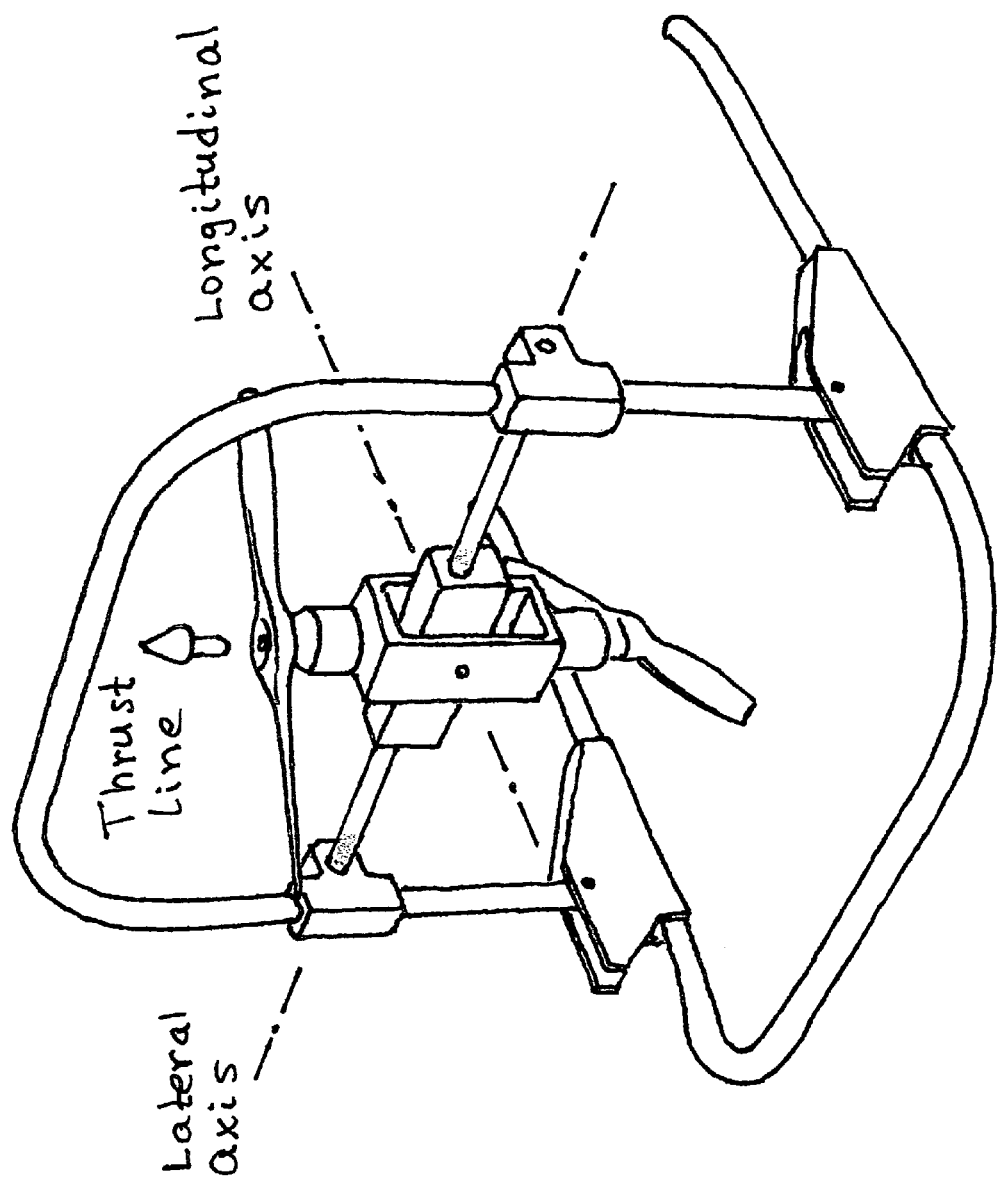
Figure 5:
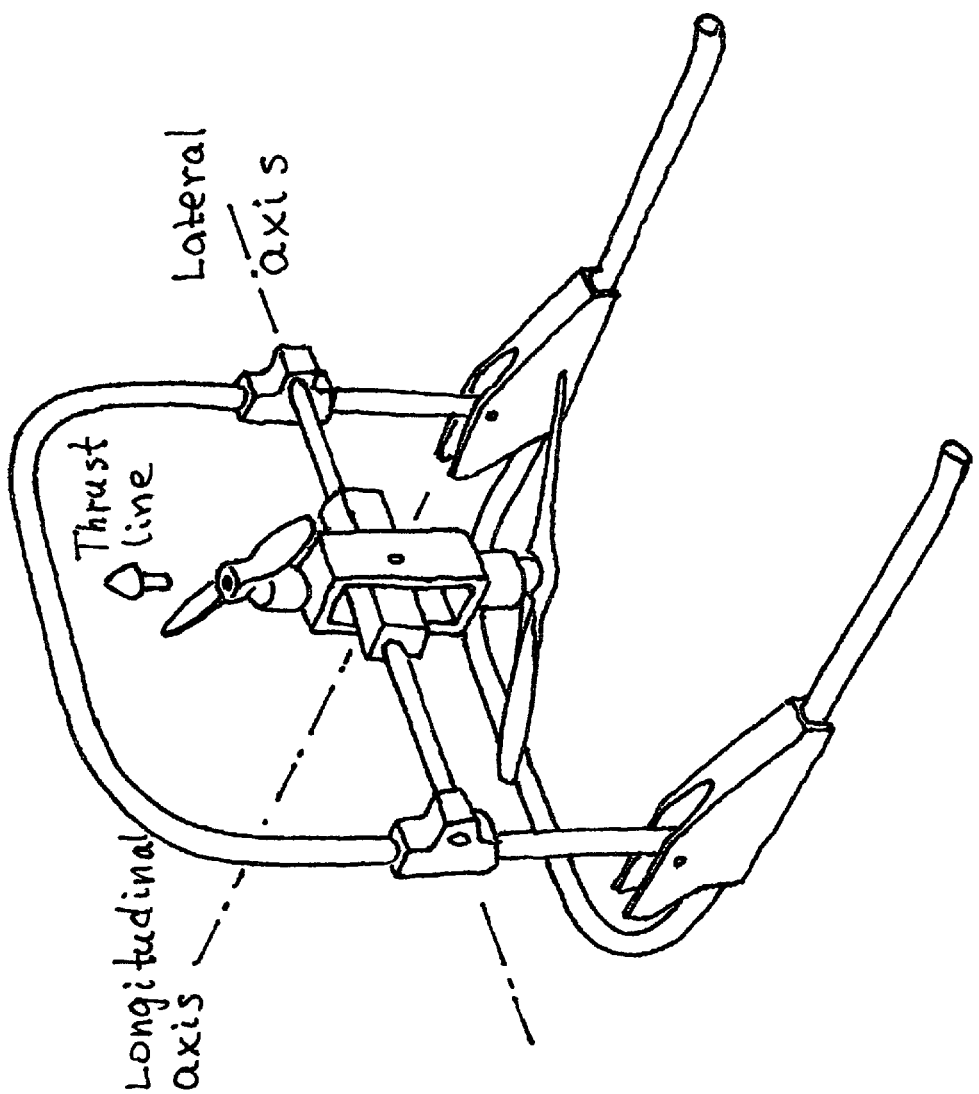

FIGS. 3 through 5 identifies the longitudinal and lateral axis, around which the engine assemble and thrust line is being tilted.

Figure 6:
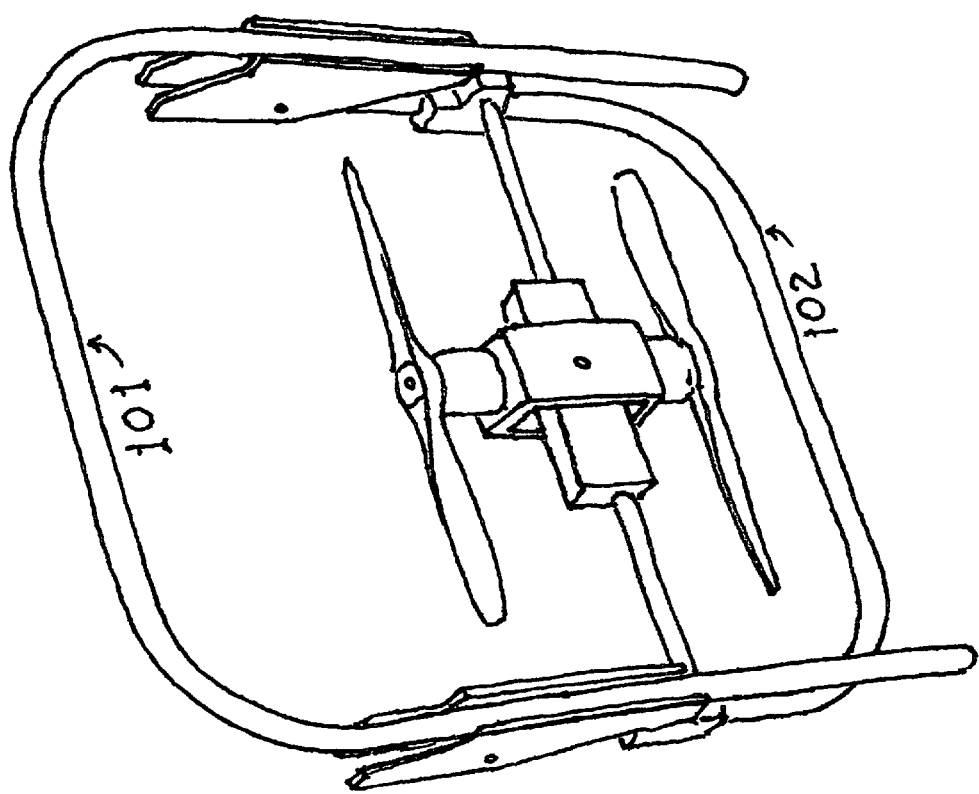

FIGS. 6 and 7 shows the Foldable Rise and Stare Vehicle in the transportable condition.

I claim:

1. A Foldable Rise and Stare Vehicle capable of vertical hover and stare, comprising:
   A base frame;
   A foldable frame;
     The two frame components connected with a pair of joiners permitting the foldable frame to unfold about 90 degrees from the base frame;
   An engine assembly attached to the two sides of the foldable frame affixed so as to be tilt-able about a primarily lateral axis comprising:
     A pair of inline counter-rotating propellers;
     A pair of inline counter rotating engines, each engine attached to one of the inline counter-rotating propellers;
   The entire engine assembly tilt-able around a primarily longitudinal axis.

2. The Foldable Rise and Stare Vehicle of claim 1, wherein the engine assembly is mounted so as to be tilt-able about the lateral and longitudinal axis of the Foldable Rise and Stare Vehicle such that:
   Rotation of the engine assembly about the lateral axis provides a change in direction of the thrust to contain a longitudinal component, thereby permitting control of forward/aft location of the Foldable Rise and Stare Vehicle
   Rotation of the engine assembly about the longitudinal axis provides a change in direction of the thrust to contain a lateral component, thereby permitting control of lateral position of the Foldable Rise and Stare Vehicle.

3. The Foldable Rise and Stare Vehicle of claim 1, wherein the relative speed of the inline counter-rotating engines is controlled such that a difference in speed or torque between the engines creates an imbalance in the torque produced by each engine and propeller,
   the imbalance in the torque produced by each engine and propeller being operative to control yaw of the Foldable Rise and Stare Vehicle.

4. The Foldable Rise and Stare Vehicle of claim 1, further comprising;
   flight controls for controlling the Foldable Rise and Stare Vehicle attitude and position, and;
   an automatic feedback control mechanism for stabilizing flight characteristics of the Foldable Rise and Stare Vehicle.

5. The Foldable Rise and Stare Vehicle of claim 1, wherein the inline counter-rotating engines are internal combustion engines.

6. The Foldable Rise and Stare Vehicle of claim 1, wherein the inline counter-rotating motors are electric motors.

7. The Foldable Rise and Stare Vehicle of claim 1, wherein the Foldable Rise and Stare Vehicle further comprises a radio control receiver for receiving control signals from a remote control unit.

* * * * *